Figure 1:
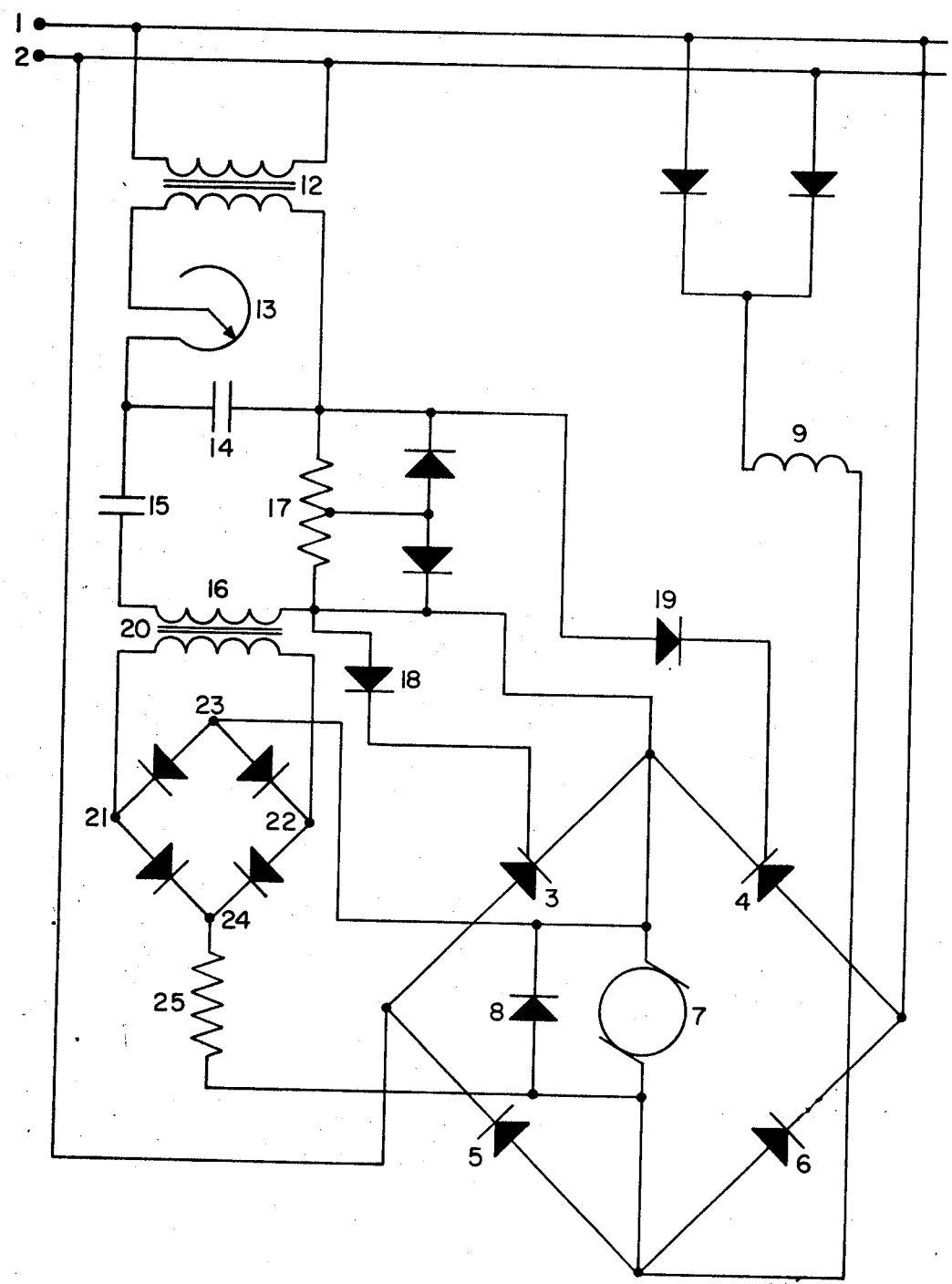

United States Patent [19]
Alexanderson

[11] 3,736,481
[45] May 29, 1973

[54] ADJUSTABLE SPEED MOTOR CONTROL SYSTEM

[76] Inventor: Ernst F. W. Alexanderson, 1132 Adams Road, Schenectady, N.Y. 12308

[22] Filed: Mar. 19, 1968

[21] Appl. No.: 714,363

[52] U.S. Cl. ............................................. 318/331
[51] Int. Cl. ............................................. H02p 5/16
[58] Field of Search ................... 318/331, 345, 434, 318/308, 301; 323/22 SC, 89 M

[56] References Cited
UNITED STATES PATENTS
3,241,024  3/1966  Schade et al. ........................318/331

OTHER PUBLICATIONS

Geyger, William A., "Magnetic–Amplifier Circuits," N.Y., McGraw-Hill, 1954, p. 60.

*Primary Examiner*—Oris L. Rader
*Assistant Examiner*—Robert J. Hickey

[57] ABSTRACT

A motor speed control comprising an SCR phase control having saturable reactor means modified by EMF feedback from the motor through a diode bridge arrangement.

6 Claims, 3 Drawing Figures

Patented May 29, 1973  3,736,481

3 Sheets-Sheet 1

INVENTOR

Patented May 29, 1973 3,736,481

3 Sheets-Sheet 2

INVENTOR

INVENTOR
Ernst F.W. Alexanderson

ADJUSTABLE SPEED MOTOR CONTROL SYSTEM

This invention relates to systems of rectification for motor control. The technique of controlled rectification was established after Langmuir's invention of the thyratron. It is described in my U.S. Pat. Ser. No. 2,550,514 filed May 19, 1932. The development of the semiconductor SCR triode has opened up new possibilities of applying the same principles.

The object of this invention is to provide a system of adjustable speed motor control which maintains a constant speed at variable load.

This problem can be approached in several ways. This invention is a new approach which leads to great simplicity in the arrangement of the electronic components.

The SCR triodes are fired by voltage pulses which are generated by an iron core reactor with sharp saturation. A single iron core reactor is used to deliver firing pulses to two SCR triodes on alternate halfcycles. The iron core reactor is energized from an adjustable phase shifting network and the current pulses which follow saturation are applied to firing the SCR triodes. Adjustment of the phase shifting network thus controls the rectified voltage and the speed of the motor. This is a complete control but the motor speed is still subject to substantial variations due to changes of motor load. An automatic correction is therefore needed.

The basic control system so far described is well adapted to the application of the desired automatic correction. But this problem needs some further explanation. The voltage applied to the iron core reactor through the phase shifting network is about twice as great as a sine wave voltage which the reactor could absorb without saturation. It therefore saturates about in the middle of the halfcycle. The correction is introduced through a secondary winding interlinked with the core of the reactor. A current is caused to flow in this secondary winding. By transformation this current is reproduced in the primary winding and caused to flow through the series related phase shifting network. The result is that the voltage impressed on the reactor winding is reduced and consequently the moment of saturation and firing is delayed. This is the desired result. If the current caused to flow through the secondary winding is a measure of the proper correction of the control the object has been achieved.

The next step is to find a source of correction which has the desired characteristics. The correction should prevent the rise in motor speed when the load is reduced. The voltage between the armature terminals has just these characteristics during the critical period of each halfcycle between the current extinction in one SCR triode and the firing of the other. At full load the motor voltage is zero and the motor current flows through the shunt related diode. At no-load however the current in the diode is quickly extinguished and the voltage rises to the counter electromotive force generated by the motor.

In using this voltage as a source of control correction there is the additional problem that this voltage is always positive whereas the corrective current in the iron core reactor must be alternating. This problem is solved by interlinking the D.C. source with the A.C. winding through an assembly of four diodes arranged as a bridge type rectifier. Through the action of this diode assembly an alternating current is reproduced in the reactor windings which in amplitude matches the current derived from the D.C. The corrective impact is proportional to the motor load. At lower speed this impact is correspondingly reduced. Correct result is thus achieved.

The invention will be best understood with reference to accompanying drawings. FIG. 1 shows single phase power applied through power terminals 1 and 2. A rectifier of the bridge type comprises SCR triodes 3 and 4 and diodes 5 and 6 connected to delivery unidirectional current to motor armature 7. A diode 8 is shunt related to the motor armature. The motor field winding 9 is energized through diodes 10 and 11.

The control system is energized from auxiliary transformer 12 which has a secondary voltage of the magnitude of 12 volts. This voltage is applied to adjustable resistance 13 series related to capacitor 14. Adjustment of the resistance establishes a voltage of adjustable phase and constitutes the operator's control. In shunt relation to capacitor 14 is a circuit which comprises in series relation a capacitor 15, an iron core reactor 16 and a resistance 17. The current pulses which trigger the firing of th SCR triodes are generated by the saturation of the iron core reactor and pass through resistance 17. This creates sharp peaks of voltage in the resistance. These peaks of voltage are of reversed polarity on alternate halfcycles. The midpoint of the resistance is connected to the junction of the cathodes of SCR triodes 3 and 4. The two outside terminals of the resistance become positive on alternate halfcycles and are connected to the gate terminals of the two SCR triodes respectively. These connections pass through diodes 18 and 19 so as to prevent the application of a negative voltage. A pair of diodes are also indicated as bypassing the idle halves of resistance 17. This emphasizes the voltage peaks applied to the triode gates but this arrangement is optional.

The system of control so far described is complete in itself but to meet the object of this invention an automatic correction must be applied so as to maintain constant speed during variations of motor load. This correction is applied to a secondary winding 20 interlinked with the core of the reactor 16.

This secondary winding is connected to the A.C. terminals 21 and 22 of a diode assembly which serves as a link in the correction circuit. The D.C. terminals 23 and 24 are connected in series relation to the high resistance 25. This circuit is energized from the terminals of the motor armature 7. The motor voltage thus becomes the source of the correction which is measured by the unidirectional current which flows through resistance 25. The diode assembly then translates this current into an alternating current of the same amplitude which is caused to flow through winding 20 and thereby applies the correction to the control. This constitutes the desired automatic compensation for changes of motor load.

This invention has been developed primarily as a single phase system but the same principles are applicable to a three phase system. A typical three phase rectifier system comprises three SCR triodes and three diodes with a diode shunt related to the output terminals. The control system in accordance with this invention comprises three controls such as described above energized in proper phase relation to trigger the firing of the three SCR triodes. Here it should be noted that the single phase control network is designed to fire two triodes. The three phase system however has only one triode in each phase. The connection to a second triode gate is therefore omitted. This has no effect on the functioning of the firing pulses which are utilized. The source of the corrective impact is the motor voltage as described above. The corrective impacts from this source acts upon the three control networks. The three diode assemblies which serve as linkage are therefore connected in series through their D.C. terminals and in series with the high resistance. The A.C. terminals are independently connected to the three secondary windings on the three iron core reactors.

Figure 2:
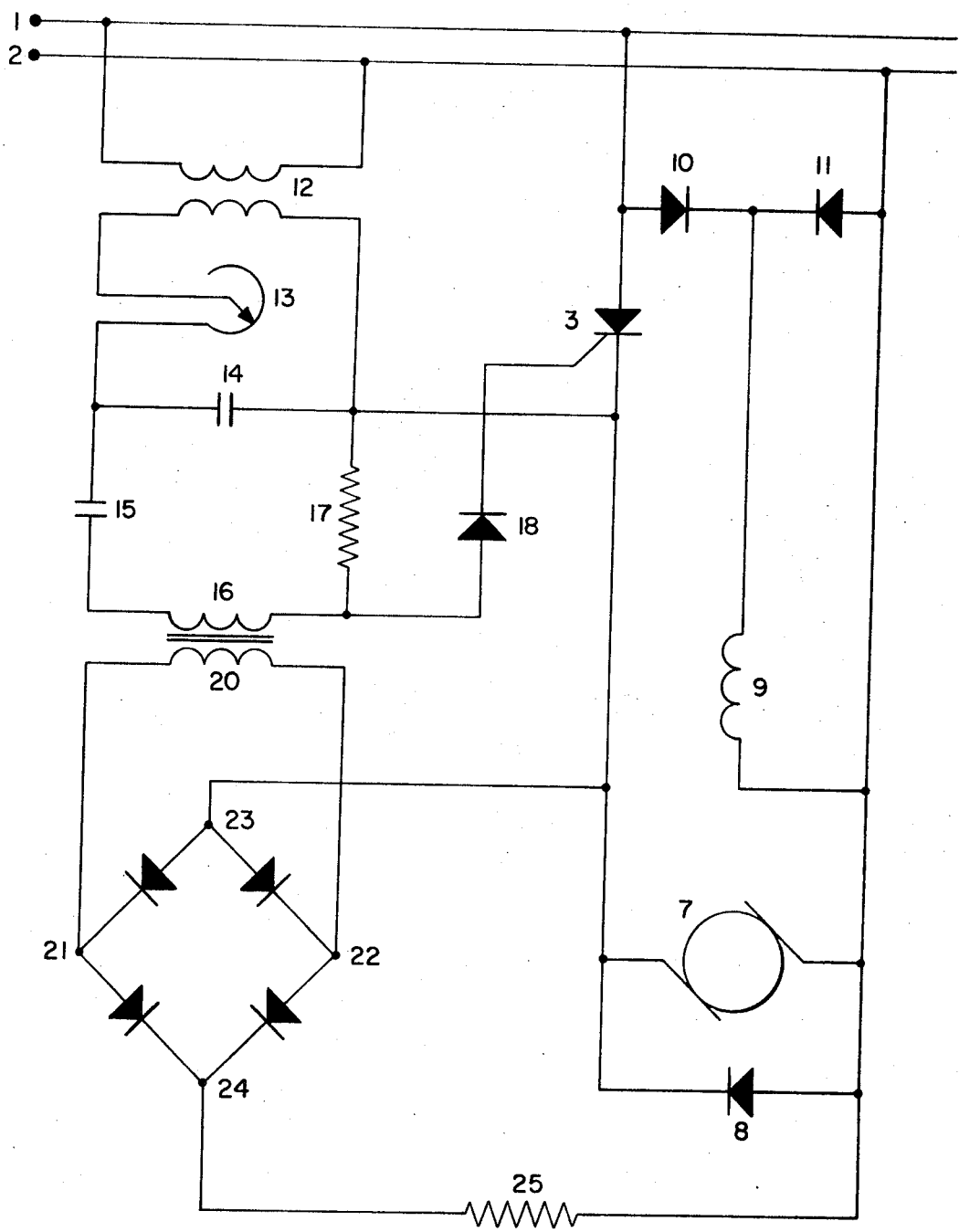

FIG. 2 shows a single phase halfwave rectifier system adapted to small motors. The power rectifier comprises one SCR triode 3 and one diode 8 shunt related to the terminals of the motor armature 7. The control network is the same as that shown in FIG. 1 and the same figures are used to designate the components. Inasmuch as a second triode is not used, the resistance 17 has no midpoint connection. One terminal is connected through diode 18 to the gate terminal of SCR triode 3 and the other terminal to the cathode of the triode. The correction circuit energized by the motor voltage functions as explained in connection with FIG. 1.

Figure 3:
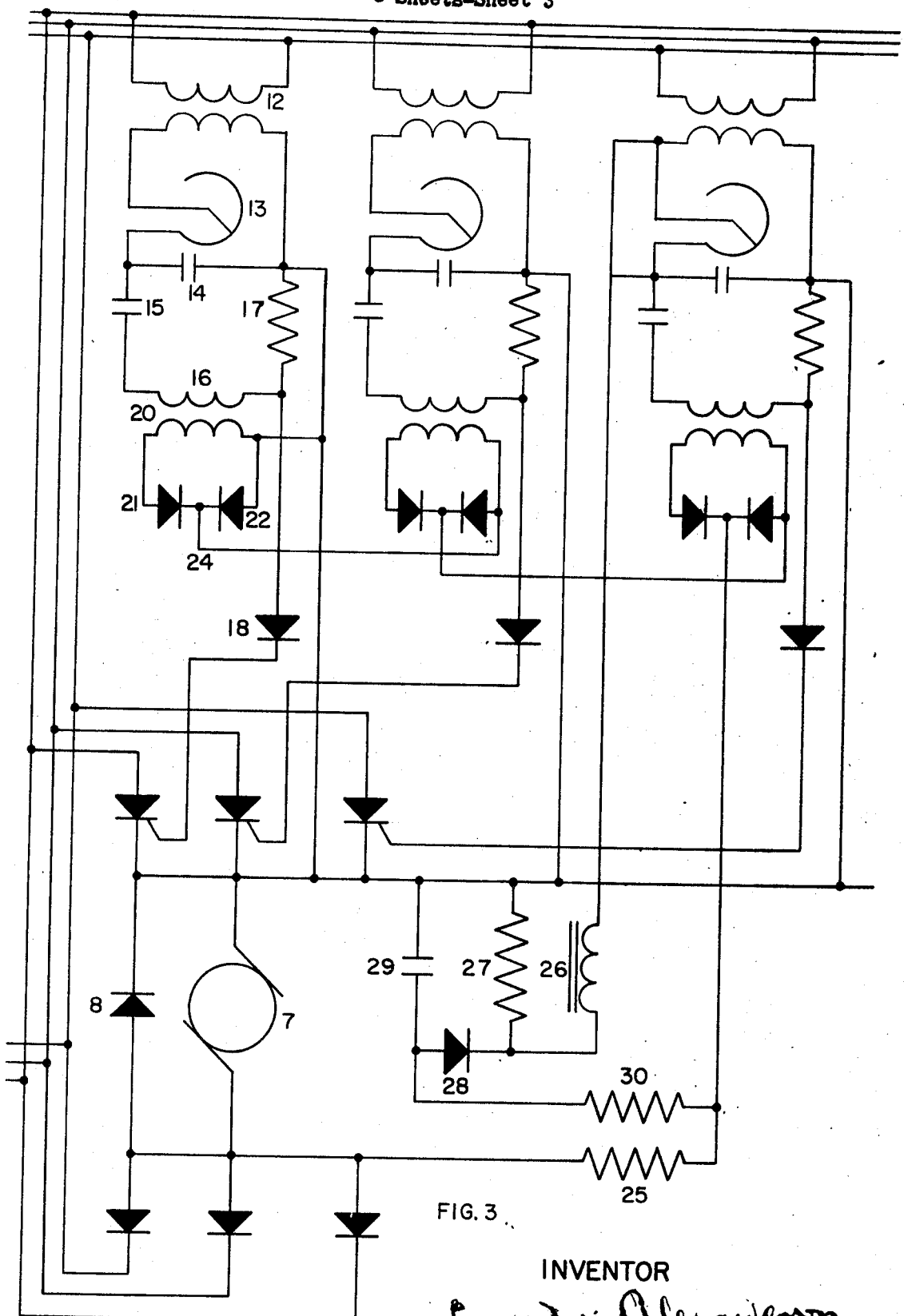

FIG. 3 shows a three phase control system. It furthermore shows the addition of a correction for variation of power voltage. This correction is applied through the same channel as the correction for changes of motor load. A source of this additional correction is provided which is sensitive to variations of the power voltage. It comprises an iron core reactor with sharp saturation energized by the power voltage. The pulses of current resulting from saturation pass through resistance 27 causing corresponding pulses of voltage which pass through diode 28 and charge capacitor 29. A D.C. voltage is thus created on the terminals of the capacitor. This voltage is the source of the correction. It is applied to a circuit which passes through resistance 30 and the control network. The current passing through this circuit is an addition to the corrective impact of the current passing through resistance 25.

FIG. 3 also shows a simplification of the diode linkage between the source of correction and the control. Only two diodes are used in each linkage. This is permissible because each of the three triggering reactors fires only one of the three SCR triodes.

While I have shown and described particular embodiments of my invention, it is my intention to cover in the appended claims all changes and modifications of the examples chosen for the purpose of disclosure which do not constitute departure from the spirit and scope of the invention.

I claim:

1. A system of adjustable speed motor control comprising a power rectifier assembly of SCR triodes and diodes and means for triggering the firing of said triodes comprising a phase shifting network adjustable by the operator and, an iron core reactor connected to be energized from said network and series related to a resistance, said resistance having one connection through a diode to the gate terminal of one SCR triode and another connection to the cathode of the same triode, this control system further comprising a secondary winding interlinked with the core of said iron core reactor, the terminals of this winding being connected to the A.C. terminals of an assembly of four diodes arranged as a bridge type rectifier, the D.C. terminals being series related to a resistance which completes a circuit between the output terminals of the power rectifier.

2. A system of adjustable speed motor control comprising two SCR triodes and two diodes assembled as a bridge type rectifier connected to deliver unidirectional current to the armature of a D.C. type motor with a diode shunt related to said terminals and a system of control for triggering the firing of said SCR triodes comprising an auxiliary transformer connected to energize a control network comprising an adjustable resistance series related to a capacitor, said capacitor being shunt related to a circuit comprising in series relation a capacitor, an iron core reactor and a resistance, the midpoint of said resistance being connected to the junction between the cathodes of the two SCR triodes, the outside terminals of this resistance being connected through diodes to the gate terminals of the two triodes, the control system comprising further a secondary winding interlinked with the core of said iron core reactor, the terminals of this winding being connected to the A.C. terminals of an assembly of four diodes arranged as a bridge to rectifier, the D.C. terminals of this diode assembly being series related to a resistance which completes a circuit between the armature terminals of the motor.

3. A system of adjustable speed motor control comprising an SCR triode connected to be energized from one terminal of an alternating current power supply and connected to one terminal of a DC type motor, the other armature terminal of said motor being connected to the power terminal of opposite polarity, a diode shunt related to the motor terminals and, a phase shifting network adjustable by the operator connected to trigger the firing of said SCR triode comprising in series relation a capacitor, an iron core reactor and a resistance, one terminal of said resistance being connected to the gate terminal of said triode and the other terminal connected to the cathode of the triode, the control further comprising a secondary winding interlinked with the core of said reactor and connected to the A.C. terminals of an assembly of four diodes arranged as a bridge type rectifier, the D.C. terminals being series related to a resistance which completes a circuit between the motor terminals.

4. An adjustable speed motor control system comprising a three phase rectifier assembly of SCR triodes and diodes connected to deliver unidirectional current to a D.C. type motor and means for triggering said SCR triodes comprising a phase shifting network adjustable by the operator connected to energize an iron core reactor connected to the gate terminal of one of the SCR triodes and means for applying correction for changes of motor load comprising a secondary winding interlinked with the core of said reactor this winding being connected to the outside terminals of an assembly of two diodes arranged as a halfwave rectifier, the middle terminal being series related to a corresponding diode linkage to the secondary windings of the two iron core reactors connected to the other two SCR triodes, said circuit of three diode linkages and windings being series related to a resistance which completes a circuit between the terminals of the motor armature.

5. An adjustable speed motor control system as in claim 4 further comprising means for applying correction for variations of the power voltage, said means comprising an iron core reactor connected to be energized by the power voltage and series related to a resistance, said resistance being shunt related to a circuit passing through the secondary windings of the iron core reactors which are connected respectively to the three SCR triodes.

6. A system of motor control comprising a direct current type motor, two units of SCR triodes assembled as a power rectifier, a phase shifting control system adjustable by the operator comprising a transformer, a resistance in series with the primary winding thereof and diodes, the terminals of said resistance being connected through said diodes to the gates of said SCR triodes and a circuit between the motor terminals comprising in series relation one diagonal of said square diode assembly, the other diagonal of said diode assembly being connected to the secondary winding of a transformer.

* * * * *